US012418550B2

(12) United States Patent
Benisty et al.

(10) Patent No.: US 12,418,550 B2
(45) Date of Patent: Sep. 16, 2025

(54) UNTRUSTED REMOTE REPLICATION PARTNERING

(71) Applicant: Dell Products L.P., Round Rock, TX (US)

(72) Inventors: Lior Benisty, Beer Sheva (IL); Arieh Don, Newton, MA (US); Efi Levi, Beer Sheba (IL)

(73) Assignee: Dell Products L.P., Round Rock, TX (US)

( * ) Notice: Subject to any disclaimer, the term of this patent is extended or adjusted under 35 U.S.C. 154(b) by 261 days.

(21) Appl. No.: 18/183,625

(22) Filed: Mar. 14, 2023

(65) Prior Publication Data

US 2024/0314150 A1   Sep. 19, 2024

(51) Int. Cl.
*H04L 9/40*   (2022.01)
*G06F 21/60*   (2013.01)

(52) U.S. Cl.
CPC ........ *H04L 63/1425* (2013.01); *G06F 21/602* (2013.01); *H04L 63/067* (2013.01); *H04L 63/1416* (2013.01)

(58) Field of Classification Search
CPC .............. H04L 63/1425; H04L 63/067; H04L 63/1416; G06F 21/602
See application file for complete search history.

(56) References Cited

U.S. PATENT DOCUMENTS

| 2006/0075189 A1* | 4/2006 | Hood | G11B 27/36 |
| | | | 714/E11.02 |
| 2008/0077635 A1* | 3/2008 | Sporny | G06F 16/1834 |
| 2019/0095458 A1* | 3/2019 | Saradhi | G06F 16/14 |
| 2020/0336311 A1* | 10/2020 | Ducker | H04L 9/088 |
| 2021/0034261 A1* | 2/2021 | Danilov | G06F 3/0664 |
| 2022/0050858 A1* | 2/2022 | Karr | G06F 11/3466 |

* cited by examiner

*Primary Examiner* — Jeffrey C Pwu
*Assistant Examiner* — Edgar W Xie
(74) *Attorney, Agent, or Firm* — Amin, Turocy & Watson, LLP

(57) ABSTRACT

Different management applications corresponding to different private computing systems that are untrusted with respect to each other reciprocally agree to store for each other replicated versions of logical volumes of storage arrays as backups. A management server corresponding to one or more storage arrays at a local one of the computing systems encrypts a volume to be backed up at the other remote computing system and transmits the encrypted version to the remote computing system. The remote computing system cannot modify or delete a portion of an array that has stored thereon the encrypted version of the logical volume without having a configuration-change key generated by the local management server, which may generate the configuration-change key to facilitate mirroring at the remote storage array a modification made to the local storage array.

20 Claims, 14 Drawing Sheets

UNTRUSTED REMOTE REPLICATION PARTNERING

BACKGROUND

The term 'cloud' may refer to a set, group, collection, or other plurality of computing resources, components, services, instances, collections, application, and the like that may be accessed by a computing resource, typically via a communication network (a communication network may also be referred to as a cloud). The term 'cloud' is typically used in reference to the computing resources without referencing specific items them make up the cloud resources when discussing computing functionality from the perspective of a computing resource that may make use of the functionality.

A cloud computing service provider may make available various computing resources, for example, software as a service, virtual machines, storage, bare metal computing hardware, or even a complete enterprise's infrastructure and development platforms, over a communication network. A cloud services provider may make a public cloud computing resource available to users over a publicly accessible network, such as the Internet. A private cloud computing resource is typically available or accessible only by a given customer, such as an enterprise and its employees. Computing resources may be provided from an enterprise's own on-premises data center or from a data center operated by an independent (e.g., independent from the enterprise customer) cloud services provider. A hybrid cloud may connect an organization's private cloud services and resources of public clouds into an infrastructure that facilitates the organization's applications and workloads in a manner that balances the maximizing of performance and the minimizing of costs across public and private cloud computing resources.

Cloud providers, whether providers of public or private computing resources, may use clustering of servers. A server cluster typically comprises servers that share a single Internet Protocol ("IP") address. Clustering enhances data protection typically, availability, load balancing, and scalability. A server associated with a cluster may be referred to as a node, which may comprise storage components such as hard drives or solid state drives, random access memory, ("RAM"), and central processing unit ("CPU") resources.

Data storage computer systems or components can facilitate the storage and manipulation of data by a variety of different network equipment. Data may be stored on a network storage component, which may be referred to as a storage or a storage array, and which may comprise a hard drive, a magnetic media drive, a solid-state drive, a memory, and the like. Manipulation may refer to one or more actions performed to a storage unit, such as a file, or files, which actions may comprise reading, writing, copying, moving, deleting, and the like.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example embodiment method may comprise receiving, by a first storage array comprising a processor from a second storage array, first replicated data comprising a replication of first original data, and storing, by the first storage array, the first replicated data, wherein the first original data is stored by the second storage array, and wherein the first replicated data is an encrypted version of the first original data encrypted by the second storage array. The first storage array or the second storage array may comprise storage components such as hard drives or solid-state drives, a management server that manages operation of hard drives or solid-state drives, or a management application that provides a user interface with users and that also interfaces with other storage arrays via a communication network, such as, for example, the Internet. The first storage array may be a component of, or components of, a first private computing network and the second storage array may be a component of, or components of, a second private computing network. The first private computing network and the second private computing network may be untrusted with respect to one another. The first original data may comprise data of a logical volume, or a portion of a logical volume, that comprises data stored by the second storage array. The first replicated data may comprise a backup of the first original data.

The example method embodiment may further comprise transmitting, by the first storage array to the second storage array, second replicated data, to be stored by the second storage array, comprising a replication of second original data, wherein the second original data is stored by the first storage array, wherein the second replicated data is an encrypted version of the second original data, and wherein the second original data was encrypted by the first storage array. The second replicated data may be a backup of the second original data.

The example method embodiment may further comprise determining, by the first storage array, a size of the first replicated data to result in a determined first replicated data size (e.g., a number of bytes) and determining, by the first storage array, a size of the second replicated data to result in a determined second replicated data size. The example method may further comprise determining, by the first storage array, that the determined first replicated data size exceeds the determined second replicated data size by a disparity amount that exceeds a configured disparity amount specified by a criterion. Based on the determining that the determined first replicated data size exceeds the determined second replicated data size by the disparity amount criterion, the example method embodiment may comprise transmitting, by the first storage array to the second storage array, a disparity notification message comprising a disparity indication indicative of the disparity amount. Determining a disparity amount may be useful when a management application corresponding to the first storage array and a management application corresponding to the second storage array, either automatically or manually based on input from users, 'negotiate' a reciprocal data sharing 'agreement' such that each storage array shares an encrypted backup of a data portion of the other storage array. If the disparity amount exceeds the configured disparity amount criterion, for example if the first replicated data size is one or more orders of magnitude larger than the second replicated data size, then the first storage array would be storing a larger backup (by at least the configured disparity amount criterion) of the second storage array than a backup size of a portion of data of the first storage array that the second array agreed to store. Accordingly, the first storage array, for example, may request compensation, or an offset. For example, the first storage array may request that the second storage array store another data portion of the first array without the first storage array agreeing to store additional data of the second array. In an embodiment, the disparity notification message may comprise a data charge (e.g., an amount of money) corresponding to the disparity amount.

In an embodiment, the example method may further comprise receiving, by the first storage array, a first one-time-use key to be used by the first storage array to facilitate a first operation corresponding to the first replicated data, and using, by the first storage array, the first one-time-use key to facilitate the first operation corresponding to the first replicated data. For example, if a user of a private computing system corresponding to the second storage array modifies a file of the first original data, a management server corresponding to the second storage array or a management application corresponding to the second array, may generate the first one time use key and transmit the first one time use key to the first storage array to facilitate modifying the first storage array accommodating an up-to-date copy of the first original data at the second array. Without the first one-time use key, a configuration of the first storage array, (e.g., a size of a logical volume of the first storage in which the first original data is stored) cannot be changed.

In an embodiment, the example method may further comprise receiving, by the first storage array, a first one-time-use key to be used by the first storage array to facilitate a first operation corresponding to the first replicated data and using, by the first storage array, the first one-time-use key to facilitate the first operation corresponding to the first replicated data. The example method may further comprise transmitting, by the first storage array to the second storage array, a second one-time-use key to be used by the second storage array to facilitate a second operation corresponding to the second replicated data. In an embodiment, the second one-time key may be used to facilitate the second storage array decrypting the second replicated data and making a change to the second replicated data at the second storage array that was made to the second original data at the first array. The first operation corresponding to the first replicated data may comprise at least one of: increasing a size of a logical volume of the first storage array that has stored therein the first replicated data, deleting a portion of the first replicated data, accessing the first replicated data, modifying the first replicated data, or moving the first replicated data.

A first computing system may comprise the first storage array, a second computing system may comprise the second storage array, the first computing system may be part of a first private computing network, and the second computing system is part of a second private computing network distinct from the first private computing network. The first private computing network may comprise a first private cloud and the second private computing network may comprise a second private cloud.

In another example embodiment, a first storage array, may comprise a processor, configured to encrypt a first portion of original data to result in a first replicated data portion and transmit, to a second storage array, the first replicated data portion. The first storage array and the second storage array may correspond to a first private computing system and a second private computing system, respectively, that are untrusted with respect to one another.

The processor of the first storage array may be further configured to perform a first operation with respect to the first portion of original data; generate a first one-time-use key to be used by the second storage array to enable performance, by the second storage array, of the first operation with respect to the first replicated data portion; and transmit the first one-time-use key to the second storage array. For example, if a user of a first private computing system corresponding to the first storage array makes a change to a file (e.g., original data) stored on the first storage array the first one time use key may be used by the second storage array, or a component of the second private computing system corresponding thereto, to facilitate making the same change to the first replicated data portion that the user corresponding to the first storage array made to the file at the first storage array. The change may be facilitated by increasing a size of a logical volume of the second storage array to accommodate a change in size of the first replicated data corresponding to a size change made to the file at the first private computing system. The change may be facilitated by deleting a logical volume of the second storage array to accommodate a deletion of the first replicated data corresponding to a deletion of a logical volume made at the first private computing system.

The processor of the first storage array may be further configured to encrypt a second portion of original data to result in a second replicated data portion; and transmit, to a third storage array, the second replicated data portion. Thus, for example, a backup of the original data may be distributed across the second storage array and the third storage array with the second storage array and the third storage array being unable to modify a portion of the backup stored at the other storage array.

The processor of the first storage array may be further configured to perform a second operation with respect to the second portion of original data; generate a second one-time-use key to be used by the third storage array to enable performance, by the third storage array, of the second operation with respect to the second replicated data portion; and transmit the second one-time-use key to the third storage array. Thus, if, for example, a user corresponding to the first storage array makes a change to the original data that is backed up at the third storage array, the second one-time-use key may be transmitted only to the third storage array to be used thereby to update the third storage array to accommodate a change of the second replicated data portion. In an embodiment, the first operation and the second operation may comprise performing a same action, by the second storage array and the third storage array, respectively, with respect to the first replicated data portion and the second replicated data portion, respectively. In an embodiment, the first operation and the second operation may comprise modifying, by the second storage array and the third storage array, respectively, the first replicated data portion and the second replicated data portion, respectively. In an embodiment, the first replicated data portion and the second replicated data portion may be logical volumes, respectively.

In yet another example embodiment, a non-transitory machine-readable medium, may comprise executable instructions that, when executed by a processor of a first management server corresponding to a first network-connected storage array, facilitate performance of operations. The operations may comprise receiving, from a second management server corresponding to a second network-connected storage array, first encrypted data having a first size, wherein the first encrypted data comprises an encrypted version of a first portion of first original data stored by the second network-connected storage array, and wherein the first portion of the first original data was encrypted by the second management server to result in the first encrypted data, and storing the first encrypted data to the first network-connected storage array. The first network-connected storage array and corresponding management server may be parts of a first private computing system. The second network-connected storage array and corresponding second management server may be parts of a second private computing system. The first private computing system and the second private computing system may be different private computing systems. The first management server and the second management server may comprise a first management application and a second management application, respectively.

In an embodiment, the operations may further comprise receiving, from a third management server corresponding to a third network-connected storage array, a first storage request to store second encrypted data having a second size, wherein the second encrypted data comprises an encrypted version of a second portion of second original data stored by the third network-connected storage array, and wherein the second original data was encrypted by the third management server to result in the second encrypted data. The operations may further comprise analyzing the first size and the second size with respect to a storage size criterion to result in a determined combined size. The operations may comprise determining that the determined combined size satisfies the storage size criterion, and, based on the determined combined size satisfying the storage size criterion and responsive to the first storage request, transmitting, to the third management server, a storage acceptance message indicative of the first network-connected storage array being able to store the second encrypted data. The operations may comprise receiving the second encrypted data that was transmitted by the third management server responsive to the storage acceptance message and storing the second encrypted data to the first network-connected storage array.

In an embodiment, the storage size criterion may be satisfied by the determined combined size being less than a configured free storage space amount allocated on the first network-connected storage array for storage of data corresponding to one or more computing systems other than the first private computing system. In an embodiment, the storage size criterion is satisfied by the first size being less, by a configured amount, than the second size.

In an embodiment, the operations may further comprise encrypting a second portion of second original data stored by the first network-connected storage array to result in second encrypted data having a second size; transmitting, to the second management server, a first storage request to store the second encrypted data; receiving, from the second management server, a first storage acceptance message indicative of the second network-connected storage array being able to store the second encrypted data; and transmitting, to the second management server, the second encrypted data to be stored by the second network-connected storage array. The operations may further comprise transmitting a second storage acceptance message indicative of the first network-connected storage array being able to store the first encrypted data, wherein the second storage acceptance message is transmitted responsive to the first storage request.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate monitoring file sharing commands between network equipment to identify adverse conditions. One or more embodiments can use different approaches to, without adversely affecting system performance, detect adverse conditions that can occur when networked equipment uses resource sharing communications (e.g., commands) to alter data on data storage equipment. Monitoring and analyzing commands generated for data manipulation can, in one or more embodiments, result in the detection of malware before damage, such as unauthorized appropriation of data stored to a data store occurs. A data store, such as a hard drive, a magnetic disc drive, a solid-state drive, a memory, and the like, may be referred to as a storage, and may be implemented as a storage that is accessible to multiple computing device. A storage may be a cloud storage that is accessible by multiple computing devices via a network.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
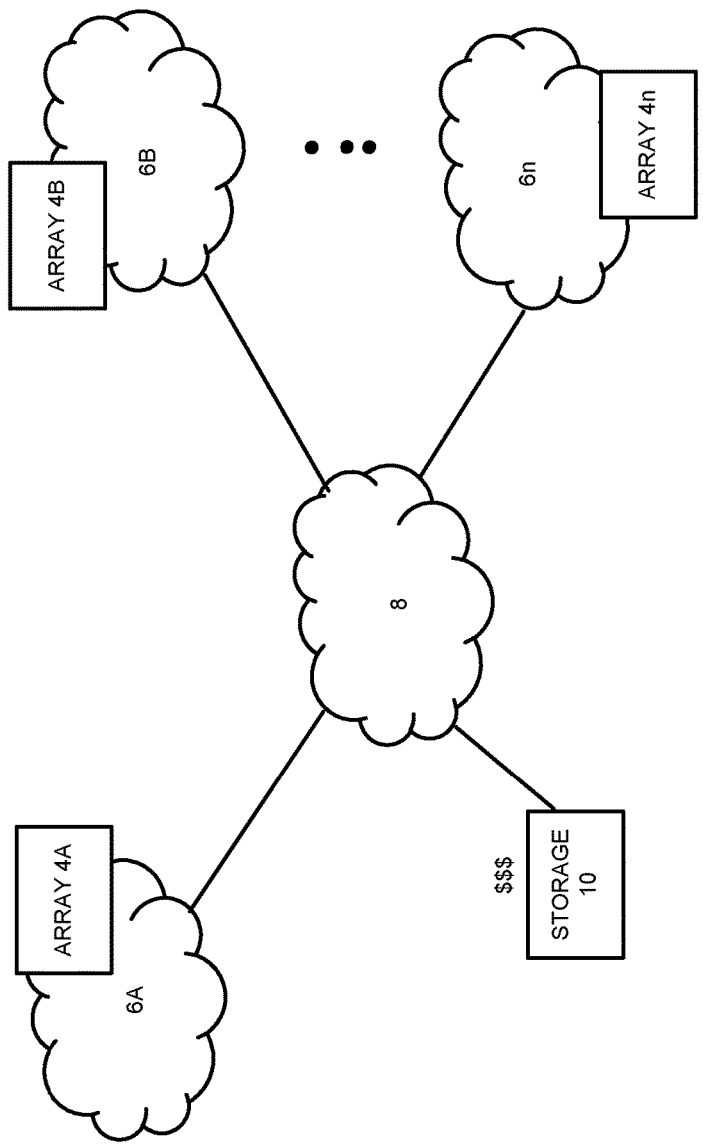
FIG. 1 illustrates an example hybrid cloud computing system network environment.

FIG. 1 illustrates a diagram of an example network system 100 that comprises private storage arrays 4A, 4B ... 4n, that are parts of corresponding private computing systems 6A, 6B, ... 6n, respectively. Private cloud computing systems 6A, 6B ... 6n may be referred to as private clouds or private cloud networks. Private clouds 6A, 6B ... 6n may be communicatively coupled with publicly accessible storage array 10 via public computing network 8, which may comprise the Internet. One or more users corresponding to private clouds 6A, 6B, ... 6n (e.g., users who have login credentials that facilitate accessing data stored on private storage arrays 4A, 4B, ... 4n) may replicate data from one or more of the private storage arrays to public storage array 10, for example to facilitate backing up of data stored at one or more of the private cloud arrays. However, as indicated in FIG. 1 by three dollar signs ("$$$"), an operator of public-network-connected storage array 10 may impose a cost on user or operators of private clouds 6A, 6B ... 6n to store replicated data on the public-network-connected storage array.

Figure 2:
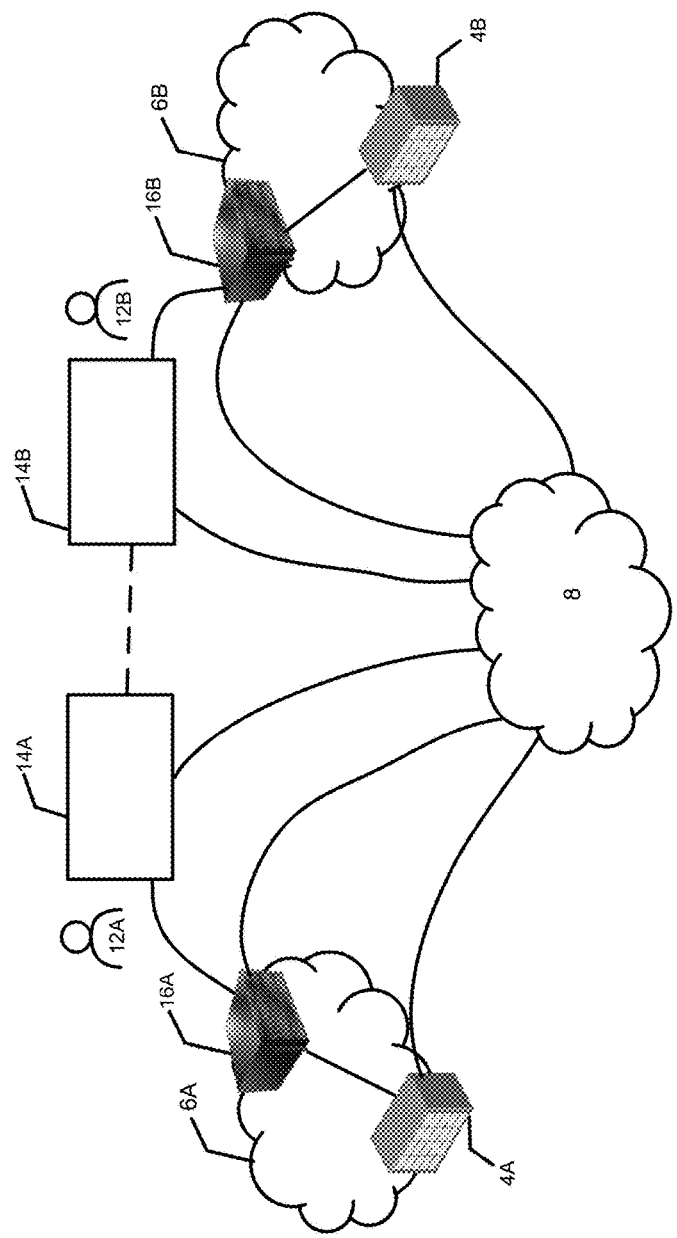
FIG. 2 illustrates a diagram of an example computing system network to replicate a data portion from a trusted storage array to an untrusted storage array.

As shown in system 200 of FIG. 2, a private cloud computing system 6A or 6B may comprise respective corresponding storage array components 4A and 4B, respective management servers 16A and 16B, and respective corresponding system management applications 14A and 14B, which are represented in FIG. 2 by graphical user interface ("GUI") icons. In an embodiment, system management applications 14A and 14B may comprise executable instructions that execute on respective management servers 16A or 16B. In an embodiment, system management applications 14A 14B may comprise executable instructions that execute on respective computing components of private clouds 6A or 6B other than management servers 16A or 16B. A management application 14A or 14B may be part of a suite of cloud management services, such as DELL TECHNOLOGIES APEX® services offered by Dell, Inc. Management applications 14A or 14B may provide a console (e.g., a GUI) for use by users 12A or 12B, respectively to access and manipulate data stored on respective storage arrays 4A and 4B. For some embodiments, the term storage array may be used herein to refer to storage components, such as hard drives or solid-state drives and corresponding computing components that interface with and facilitate operation of the drives. For some embodiments, the term storage array may be used to refer to a combination of storage arrays 4 (e.g., drives and corresponding computing equipment) as well as a corresponding management server 16 and software running thereon. For some embodiments, the term storage array may be used to refer to a combination of a storage arrays 4 (e.g., drives and corresponding computing equipment), corresponding management server 16 and software running thereon, and corresponding management applications 14. Various components that make up, or that facilitate, storage arrays 4, management servers 16 and management applications 14 may be facilitated by components described in more detail in reference to FIG. 14.

It will be appreciated that the computer processing systems, computer-implemented methods, apparatus, and computer program products described herein may employ computer hardware and/or software to solve problems that are highly technical in nature (e.g., rapidly evaluating network command activity and controlling communication among devices in different contexts), that are not abstract and cannot be performed as a set of mental acts by a human. For example, a human, or even a plurality of humans, cannot apply criteria to activity of network equipment or a network storage and provide a corrective mitigating action in a timely manner as can various embodiments described herein. Embodiments described herein may enhance the functionality of computing systems and networks themselves.

It will be appreciated that the embodiments of the subject disclosure depicted in various figures disclosed herein are for illustration only, and as such, the architecture of such embodiments are not limited to the systems, devices, and/or components depicted therein. For example, in some embodiments, arrays 4, management servers 16, and management applications 14 can further comprise various computer and/or computing-based elements described in reference to operating environment 1400 and FIG. 14. In one or more embodiments, such computer and/or computing-based elements can be used in connection with implementing one or more of the systems, devices, components, and/or computer-implemented operations shown and described in connection with FIG. 1 or other figures disclosed herein.

A management application 14 may execute code instructions that may operate on servers or systems, remote data centers, or 'on-box' in individual client information handling systems, according to various embodiments herein. In some embodiments, any or all implementations of one or more embodiments described herein can operate on a plurality of computers.

In system 200 storage equipment arrays 4 may comprise various components, such as, for example, storage array management host computing systems that may run management software, for example Unisphere® software offered by Dell Inc.

In embodiments, an array 4 or a management server 16 may comprise a processor and a storage device. According to multiple embodiments, an array 4 or a management server 16 can further include memory that can store one or more computer and/or machine readable, writable, and/or executable components and/or instructions that, when executed by processor, can facilitate performance of operations defined by the executable component(s) and/or instruction(s). In embodiments, a memory of an array 4 or of a management server 16 can store one or more computer and/or machine readable, writable, and/or executable components and/or instructions, which can, when executed by a processor thereof, facilitate performance of operations defined by the executable component, and other components described or suggested by different embodiments described herein, that can improve the operation of system 200. A reference to a storage array may comprise a reference to an array 4 and a management server 16 collectively.

Figure 3:
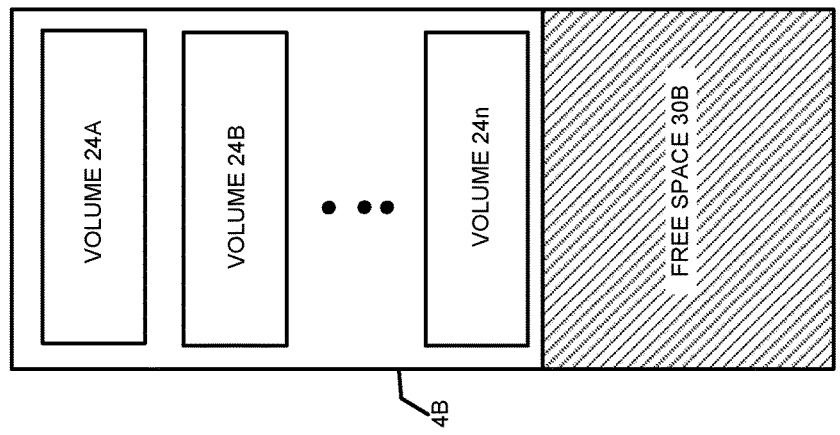
FIG. 3 illustrates example contents of storage arrays of different private computing system networks.
Figure 3:
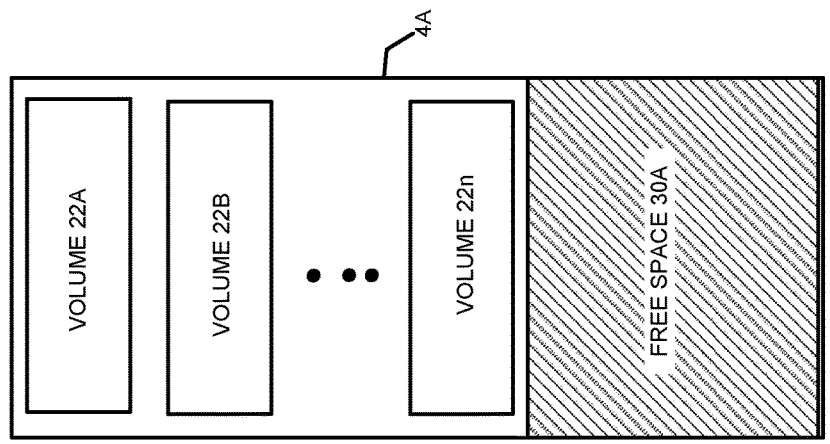

Turning now to FIG. 3, the figure illustrates example system 300 comprising storage arrays 4A and 4B corresponding to different private computing system networks, for example private clouds 6A and 6B described in reference to FIG. 2. Continuing with description of FIG. 3, array 4A is shown comprising volume 22A, volume 22B, and volume 22n, which volumes may be referred to as data portion 22A, data portion 22B, or data portion 22n, respectively. Array 4A is also shown with free space 30A, which may be referred to as available space 30A. Similarly, FIG. 3 shows array 4B comprising volume 24A, volume 24B, and volume 24n, which may be referred to as data portion 24A, data portion 24B, or data portion 24n, respectively. Array 4B is also shown with free space 30B, which may be referred to as available space 30B. Volumes 22A, 22B, ... 22n, and 24A, 24B, ... 24n, may comprise, or may be, logical volumes. Logical volumes 22A, 22B, ... 22n, may be established or created at the direction of management software that facilitates operation of components of array 4A, and logical volumes 24A, 24B . . . 24n, may be established or created by management software that facilitates operation of components of array 4B.

Figure 4:
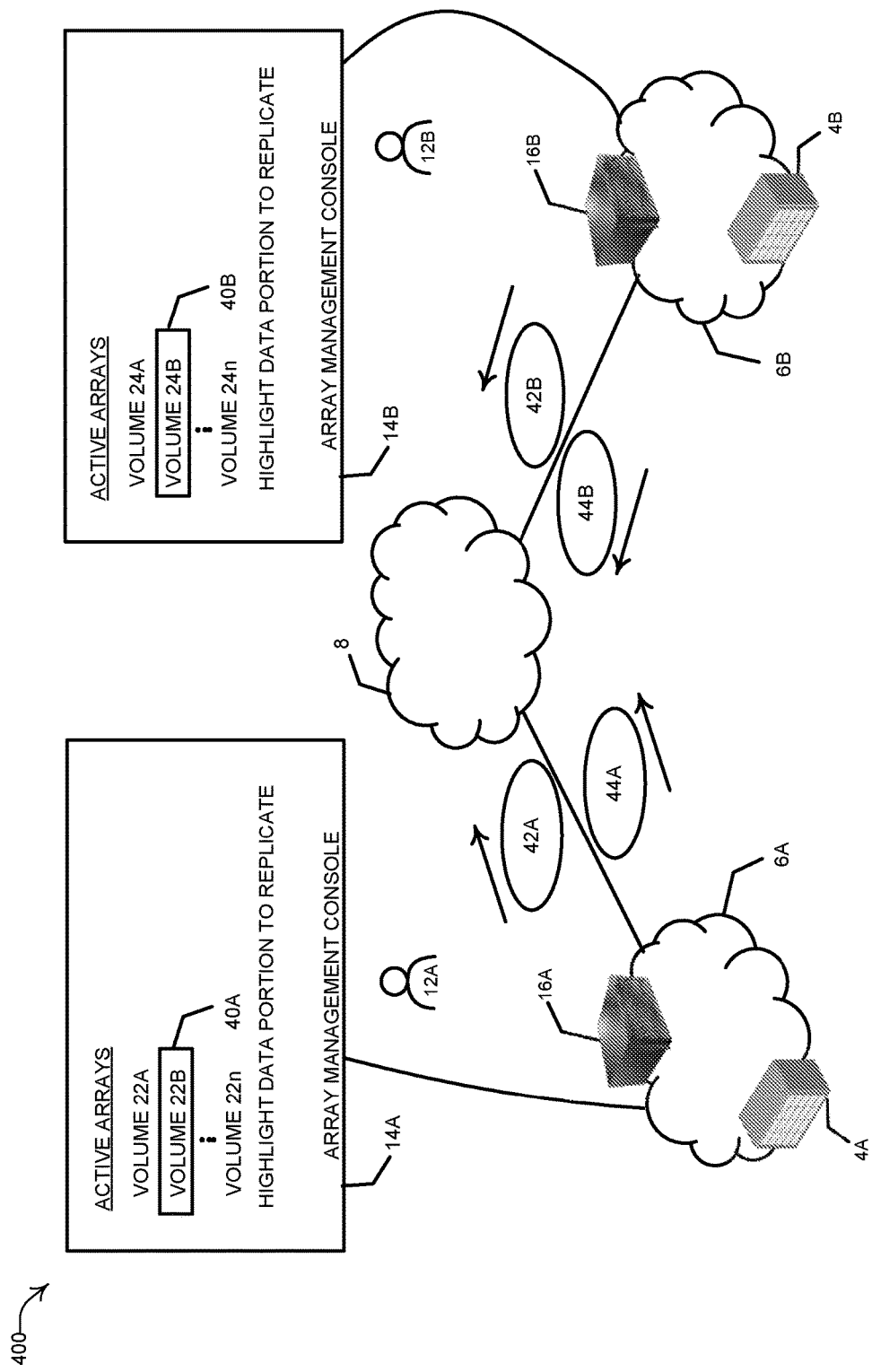
FIG. 4 illustrates an example system to negotiate storage of data portions to storage arrays of different private computing system networks.

Turning now to FIG. 4, the figure illustrates an example system 400 to negotiate sharing storage array resources of storage arrays 4A and 4B of different private computing system networks 16A and 16B to store replication of data portions of the storage arrays. Computing components of management servers 16A or 16B may execute software that facilitate GUIs/consoles. Software that facilitates GUIs/consoles may be referred to as management applications 14A and 14B, which may be facilitated by software executed by computing components, other than management servers 16A or 16B, of private cloud computing systems 6A and 6B, respectively. The term 'console' may be used to refer to a management application 14A or 14B.

User 12A may determine to replicate volume 22B, which may be currently stored on array 4A, via management application console 14A using selection item 40A. User 12B may determine to replicate volume 24B, which may be currently stored on array 4B, via management application console 14B using selection item 40B. Selection items 40A and 40B are shown as highlight bars, but could be any selection, such as, for examples, radio buttons, a test box, a drop-down list, and the like.

Responsive to receiving a selection input to replicate volume 22B, as highlighted by selection item 40A by user 12A, a replication storage request message 42A may be generated by management application 14A. In an embodiment, replication storage request message 42A may be generated by management server 16A, or by a computing component of private computing system 6A, responsive to an instruction from management application 14A. Responsive to receiving a selection input to replicate volume 24B, as highlighted by selection item 40B selected by user 12B, a replication storage request message 42B may be generated by management application 14B. In an embodiment, replication storage request message 42B may be generated by management server 16B, or by a computing component of private computing system 6B, responsive to an instruction from management application 14B.

By receiving a selection from user 12A, via the console facilitated by management application 14A, to replicate volume 22B, management application 14A may cause replication storage request message 42A to be transmitted to management application 14B. By receiving a selection from user 12B, via the console facilitated by management application 14B, to replicate volume 24B, management application 14B may cause replication storage request message 42B to be transmitted to management application 14A.

After receiving replication storage request message 42B, management application 14A may, either unilaterally or in cooperation with management server 16A, determine whether free space 30A (shown in FIG. 3) of storage array 4A comprises enough free space to contain a size of replicated volume 24B, as indicated in replication storage request message 42B. After receiving replication storage request message 42A, management application 14B may, in cooperation with management server 16B, determine whether free space 30B (shown in FIG. 3) of storage array 4B comprises enough free space to contain a size of replicated volume 22B, as indicated in replication storage request message 42A. If management application 14A determines that free space 30A of volume 4A is large enough to accommodate replicated volume 24B, and if management application 14B determines that free space 30B of volume 4B is large enough to accommodate replicated volume 22B, management application 14A may cause a storage acceptance message 44A to be transmitted to management application 14B, and management application 14B may cause a storage acceptance message 44B to be transmitted to management application 14A. However, in an embodiment, if one or the other of management application 14A or 14B determines that array 4A or array 4B, respectively, do not contain enough free storage space to accommodate replicated data portion 24B or 22B, respectively, acceptance message 44A or 44B may comprise an indication that request message 42B or request message 42A, respectively, is declined. In an embodiment, if management application 14A or 14B receives an acceptance message 44B or 44A, respectively, that declines a request 42A or 42B, respectively, to store volume 22B or 24B, respectively, then the management application receiving the acceptance message may retract the acceptance message that the receiving management application caused to be transmitted. For example, if management application 14A causes request 42A to be transmitted to private computing system 6B requesting that array 4B store a replicated version of volume 22B, and if management application 14A accepts a request from private computing system 6B to store a replicated version of volume 24B, but then management application 14A receives an acceptance message 44B that declines the request in message 42A to store volume 22B, management application 14A may then decline to store volume 24B even though it had already accepted the request to store volume 24B. In such a scenario, private computing networks 6A and 6B may reciprocally store replicated versions of volumes 22B and 24B, such as for purposes of backup, but one private computing network may decline to store a replicated version of a volume of the other private computing network if agreed-to storage reciprocity is not achieved. Such storage reciprocity facilitates otherwise unaffiliated, unassociated, not-trusting-of-each-other, private computing systems agreeing to share storage of backups for the other without the cost $$$ shown in FIG. 1 that may be associated with a storage array 10 that would charge an operator of the private computing networks for data storage services. In addition, storage reciprocity may facilitate trust between private computing networks that do not otherwise trust each other insofar as an operator of one private computing system having a reciprocal storage agreement with another private computing network may be inclined to protect data of another private network at which the one private network also has its data stored.

Figure 5:
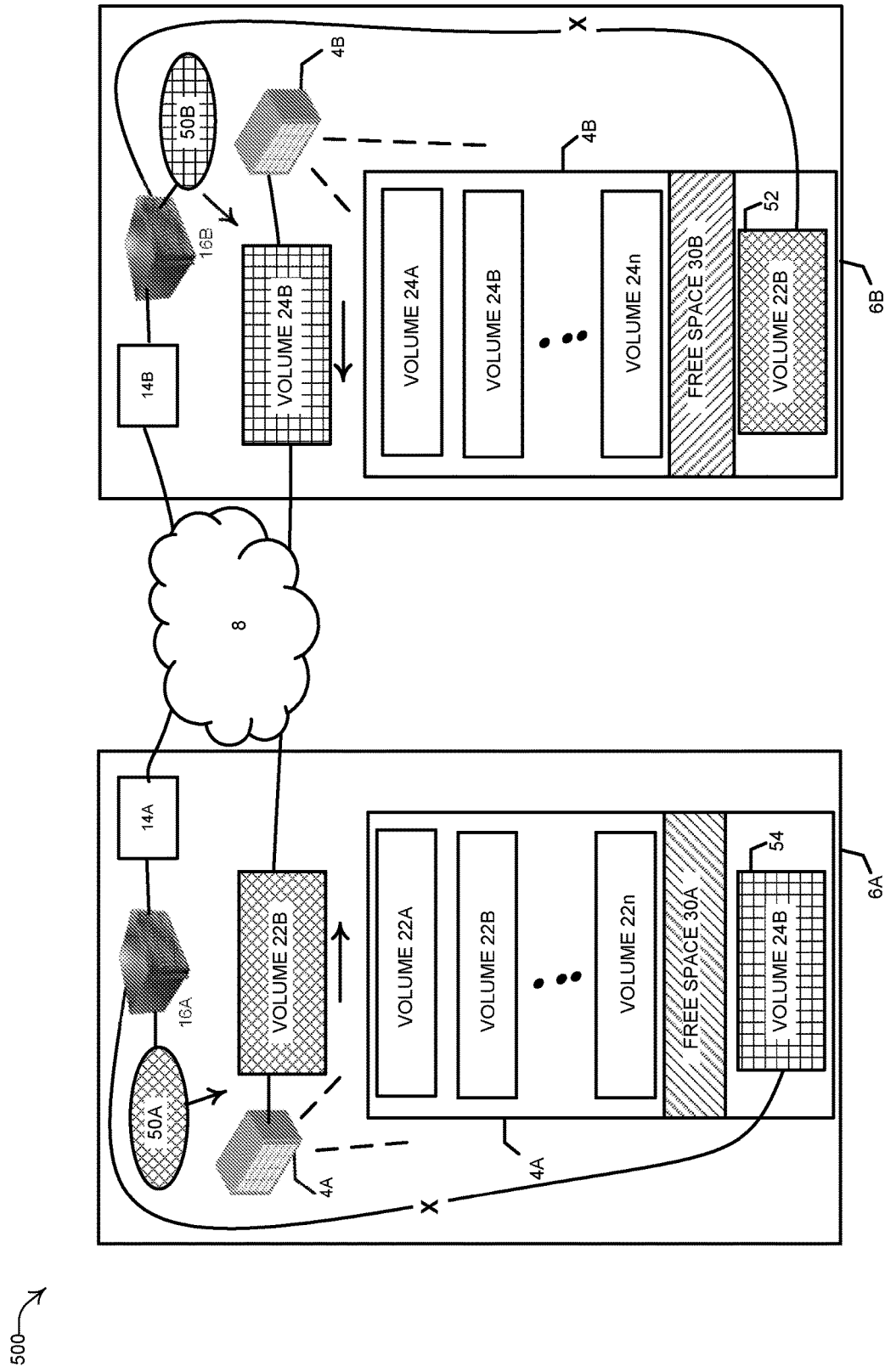
FIG. 5 illustrates an example system that does not permit data manipulation of replicated data stored on a remote storage array of an untrusted private computing system.

To further facilitate trust between private computing networks 6A and 6B, which may not otherwise have a trust relationship but for the reciprocal storage of each other's data, an example system 500 shown in FIG. 5 does not permit data manipulation of replicated data stored on a remote storage array of an untrusted private computing system. System 500 comprises private computing system 6A, which comprises storage array 4A, management application 14A, and management server 16A, and system 500 comprises private computing system 6B, which comprises storage array 4B, management application 14B, and management server 16B. Management server 16A may generate an encryption key 50A that is used by computing components at private computing system 6A to encrypt volume 22B stored in storage array 4A. Encrypted version 52 of replicated volume 22B is transmitted to private computing system 6B, where the encrypted replicated data 52 is stored in array 4B according to mutually accepted reciprocal messaging facilitated by management applications 14A and 14B as described in reference to FIG. 4. (Encrypted data 52 is shown with the same cross hatch pattern as encryption key 50A to indicate that encrypted data 52 comprises volume 22B that has been encrypted by encryption key 50A.)

Reciprocal agreement messaging between management applications 14A and 14B may comprise instructions that encrypted replicated data 52 be stored as a logical volume on array 4B such that data 52 stored on volume 4B cannot be manipulated by a component of private network 6B without permission from a component of private computing system network 6A, such as, for example, management server 16A or management application 14A. A reciprocal storage arrangement mutually agreed to (e.g., by management application 14A and 14B) between private computing systems 6A and 6B may comprise a protocol or configuration instruction that configures, or formats, array 4B such that a manipulation operation, such as accessing, copying, modifying, or deleting, of encrypted replicated data 52 cannot be accomplished without destroying formatting of array 4B thus resulting in a loss of data stored in volumes 24A, 24B, . . . 24n. Similarly, as part of a reciprocal storage arrangement between computing systems 6A and 6B, system 16A may be disabled from manipulating encrypted replicated data 54, which may be an encrypted version of volume 24B, without permission from a component of private computing system 16B. (Encrypted data 54 is shown with the same cross hatch pattern as encryption key 50B to indicate that encrypted data 54 comprises volume 24B that has been encrypted by encryption key 50B.) Such inability to manipulate encrypted replicated volume data 52 or encrypted replicated volume data 54 is indicated by an 'X' across the line in FIG. 5 between management server 16A and encrypted replicated data portion 54, and across the line between management server 16B and encrypted replicated data portion 52.

Figure 6:
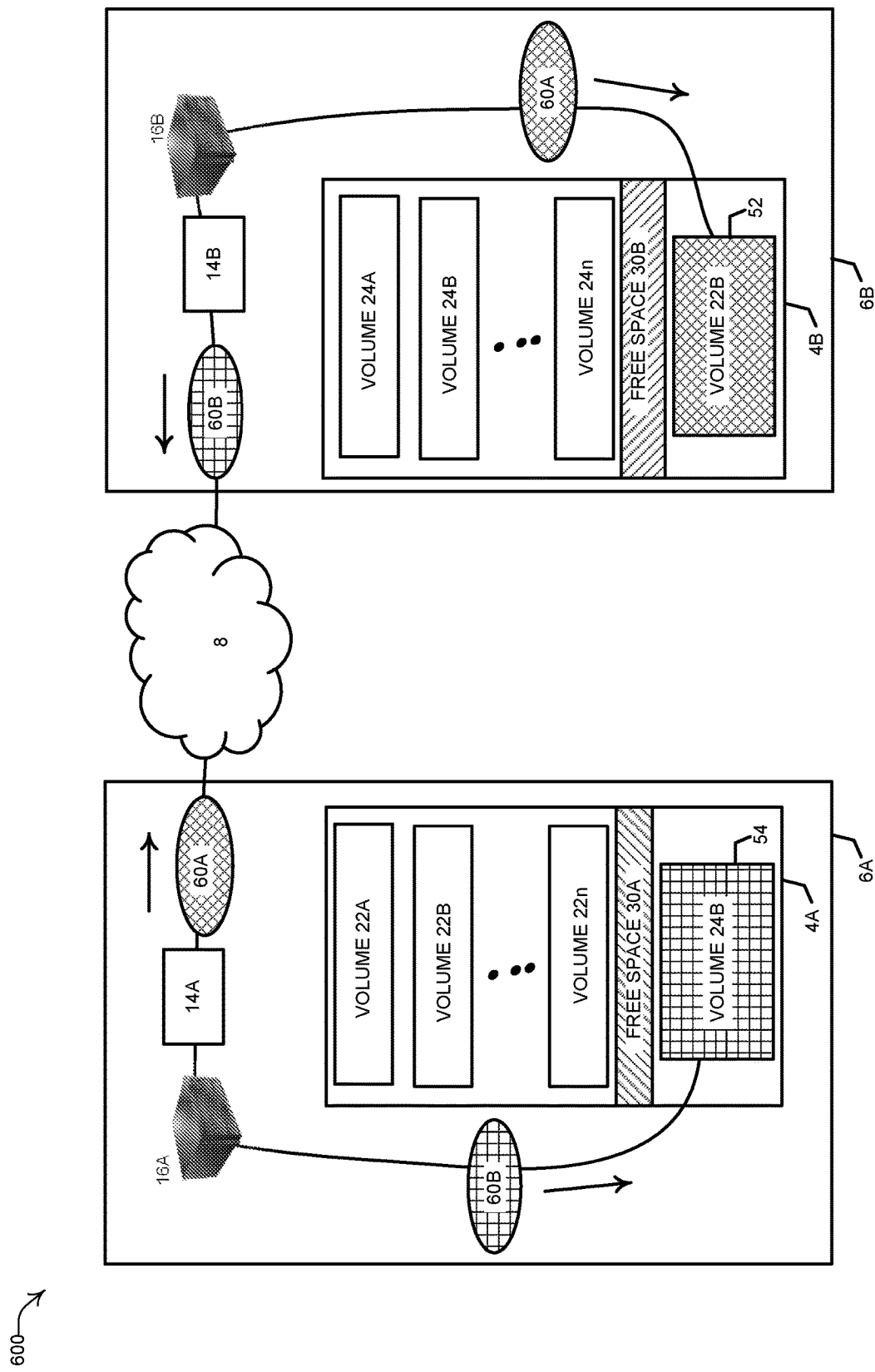
FIG. 6 illustrates an example system to facilitate data manipulation of replicated data stored on a storage array of a remote untrusted private computing system.

FIG. 6 illustrates an example system 600 to facilitate data manipulation of replicated data stored on a storage array of a remote untrusted private computing system. After a local private computing system, such as computing system 6B, receives an encrypted data portion from a remote private computing system, such as, for example, from computing system 6A, a user of the remote computing system may cause a change to the unencrypted version of the data portion stored at an array of the remote computing system. For example, a user of local computing system 6A may make a change to a file that is stored in volume 22B. In an embodiment, if encrypted version 52 of volume 22B stored on array 4B of computing system 6B is a backup of volume 22B that is stored locally at array 4A, management server 16A may automatically (or manually with approval of a user of computing system 6A) create a one-time configuration-change key 60A that is transmitted to computing system 6B to be used to facilitate making a change to (e.g., increase the size of) free space 30B, or logical volume 22B, stored on computing system 6B, to accommodate making a change to volume 22B at computing system 6B such that volume 22B stored on computing system 6B mirrors the version of volume 22B as modified at computing system 6A. One-time configuration-change key 60A is shown with the same cross hatch pattern as encryption key 50A that encrypted volume 22B (shown in FIG. 5) to represent that decryption key 60A may be complementary to, or may correspond to, encryption key 50A. Similarly, if a user of computing system 6B modifies a file that is stored on volume 24B, management server 16B may create one-time configuration-change key 60B, and transmit one-time configuration-change key 60B to computing system 16A to be used to modify free space 30A so that the same modification that was made to volume 24B at array 4B can be made by computing system 6A to volume 24B stored at array 4A. To illustrate a configuration change facilitated by on-time-use configuration-change keys 60A and 60B, volumes 22B and 24B are shown in FIG. 6 larger relative to free space 30B and free space 30A, respectively, than in FIG. 5. In an embodiment, one-time configuration-change keys 60A and 60B may have a configured or determined active time, for example, by encrypting a current time and transmitting with the one-time configuration-change keys, such that the computing system that receives a one-time configuration-change key can no longer modify portions of an array that contain the data portion that the encryption key corresponding to the one-time configuration-change key encrypted if the determined active time has expired (e.g., more than a configured time has passed since the current time when the one-time configuration-change key was transmitted. In another embodiment, a one-time configuration-change key may expire after the computing system that received the decryption key performs a modification requested by the other computing system that corresponds to the one-time configuration-change key. Thus, even though computing systems 6A and 6B may be untrusted with respect to one another, for a limited time or for a limited operation, the receiving computing system may be enabled by the other computing system to modify a configuration of the array of the receiving computing system such that data stored at a remote untrusted computing system mirrors a local version of the same data.

Figure 7:
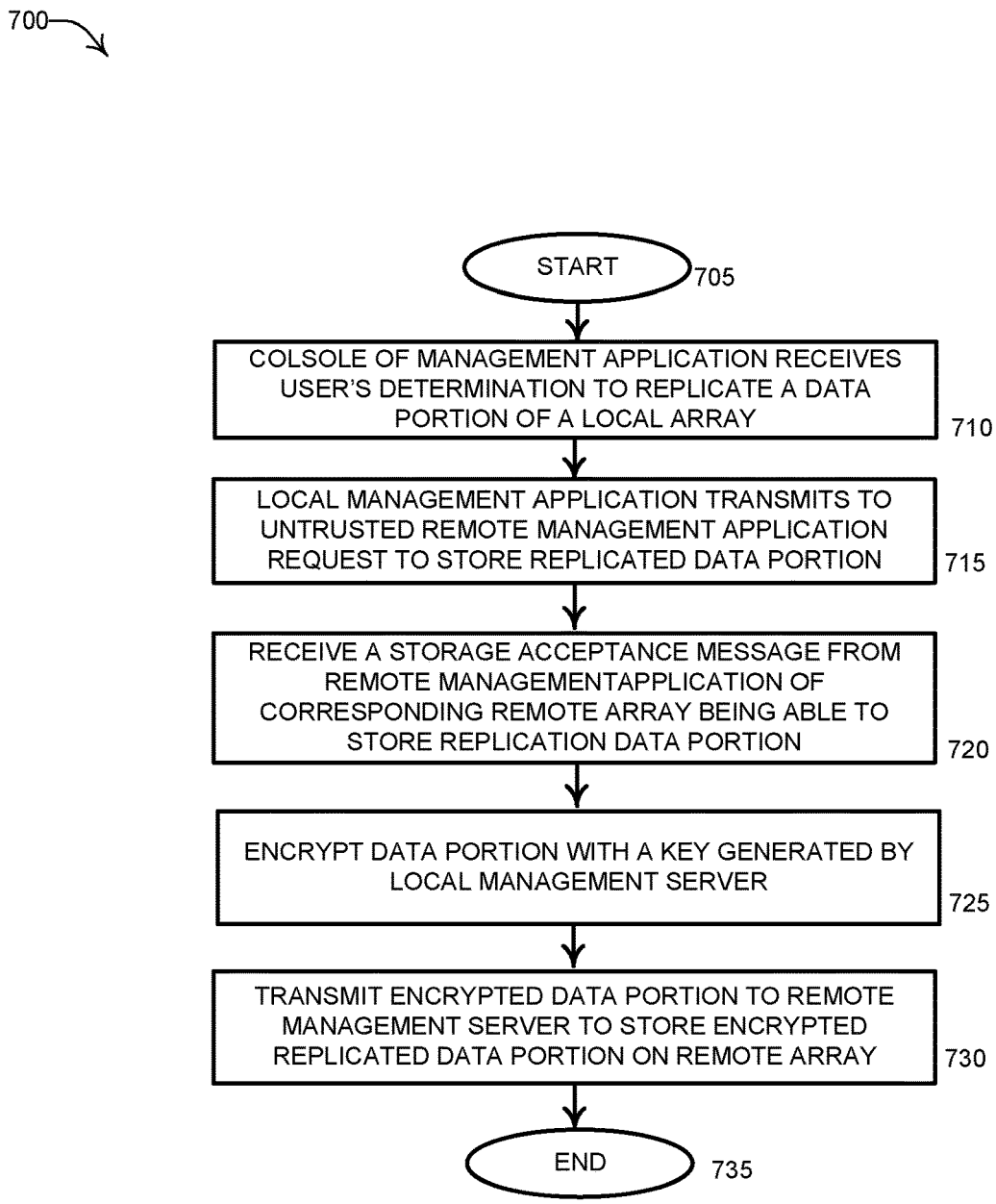
FIG. 7 illustrates a flow diagram of an example method to replicate a data portion from a trusted storage array to a remote untrusted storage array.

Turning now to FIG. 7, the figure illustrates a flow diagram of an example method 700 to replicate a data portion from a trusted local storage array, such as array 4A shown in FIG. 1-FIG. 6 to a remote untrusted storage array, such as array 4B. Continuing with the description of FIG. 7, method 700 begins at act 705. At act 710, an array management console, which may be generated or facilitated by a management application corresponding to the local storage array of a trusted local private computing system (e.g., management application 14A corresponding to computing system 6A), may receive from a user a determination to replicate a data portion, such as, for example, a logical volume, from the local array to a remote array that may correspond to an untrusted remote private computing system. At act 715, the local management application of the local private computing system may transmit to a remote management application of the untrusted remote computing system a request to store a replicated version of the data portion selected by the user for replication at act 710. At act 720, the local management application of the local private computing system may receive a storage acceptance message from the remote management application corresponding to the remote array. The storage acceptance message may contain an indication indicative of the remote array being able to store the replication of the data portion indicated in the request transmitted at act 715. At act 725, a local management server of the local private computing system may generate an encryption key and encrypt the data portion selected by the user for replication at act 710. At act 730, an encrypted version of the data portion selected for replication at act 710 may be transmitted to the remote private computing system to be stored in a remote storage array of the remote private computing system. Method 700 ends at act 735.

Figure 8:
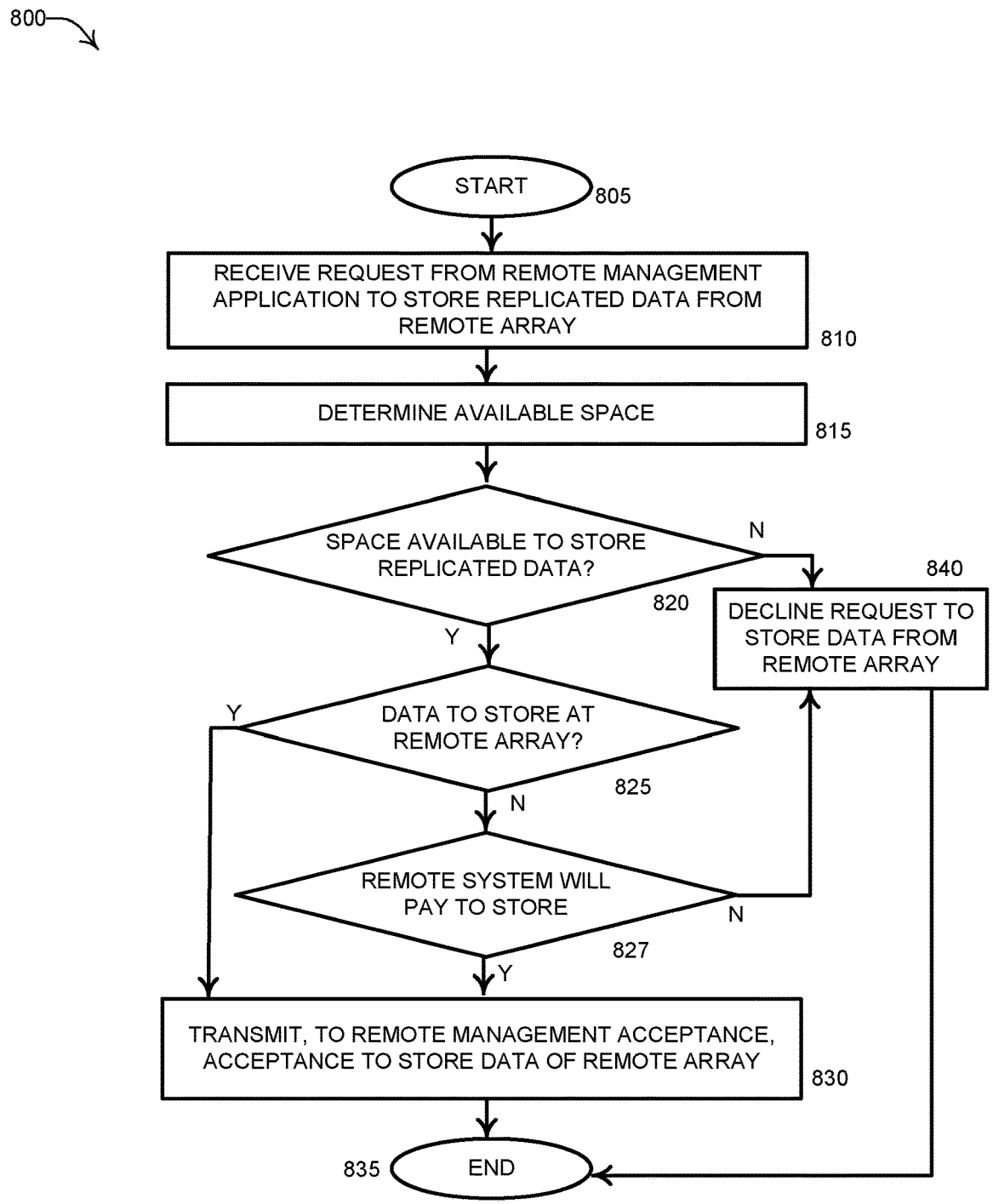
FIG. 8 illustrates a flow diagram of an example method to negotiate sharing of data between private cloud computing systems.

Turning now to FIG. 8, the figure illustrates a flow diagram of an example method 800 to negotiate sharing of data, and to share storage of data, between private cloud computing systems. Method 800 begins at act 805. At act 810, a local management application may receive a storage request from a remote management application of a remote private computing system. The storage request may comprise a request to store, by a local array of the local private computing system, a data portion stored on a remote array of the remote private computing system. At act 815, the local management application, in cooperation with the local management server, may determine whether the local storage array has enough available free space to store the replicated version of the data portion to be stored indicated in the storage request message received at act 810. At act 820, if a determination is made that the local storage array has adequate free space to store the replication of data indicated in the storage request message received at act 810, method 800 advances to act 825.

At act 825, the local management application may determine whether a local array of the local private computing system has a data portion to be stored at a remote private computing system. If a determination made at act 825 is that the local array comprises a data portion, for example a logical volume, to be stored at a remote private computing system, method 800 advances to act 830. At act 830, the local private computing system may transmit to the remote private computing system an acceptance to store the data portion indicated in the storage request that was received at act 810. Method 800 advances from act 830 and ends at act 835.

Returning to description the act 820, if a determination is made that a local array of the local private computing system does not have enough free storage space to store a replicated version of the data portion indicated in the storage request received at 810, method 800 advances to act 840. At act 840, the local management application may generate or transmit a decline message indicating that the local private computing system has declined the request received at act 810. Method 800 advances to act 835 and ends.

Returning to description 825, if a determination is made that the local remote computing system does not have a data portion to be stored at a remote private computing system (e.g., no data to be stored as part of a reciprocal storing of data with the remote computing system), method 800 advances to act 827. At act 827, a determination may be made by the local remote computing system, by requesting of the remote computing system and receiving a responsive reply therefrom, whether the remote computing system, or an operator thereof, will agree to pay for storing the data indicated in the request received at act 810. If a determination is made at act 827 that an operator of the local computing system will receive money, or other form of compensation, for storing the data indicated in the request received at act 810, the local computing system may transmit an acceptance at act 830 and end at act 835. If a determination is made at act 827 that an operator of the local computing system will not receive money, or other form of compensation, for storing the data indicated in the request received at act 810, the local computing system may determine to decline at act 840 the request received at act 810, and method 800 advances to 835 and ends.

Figure 9:
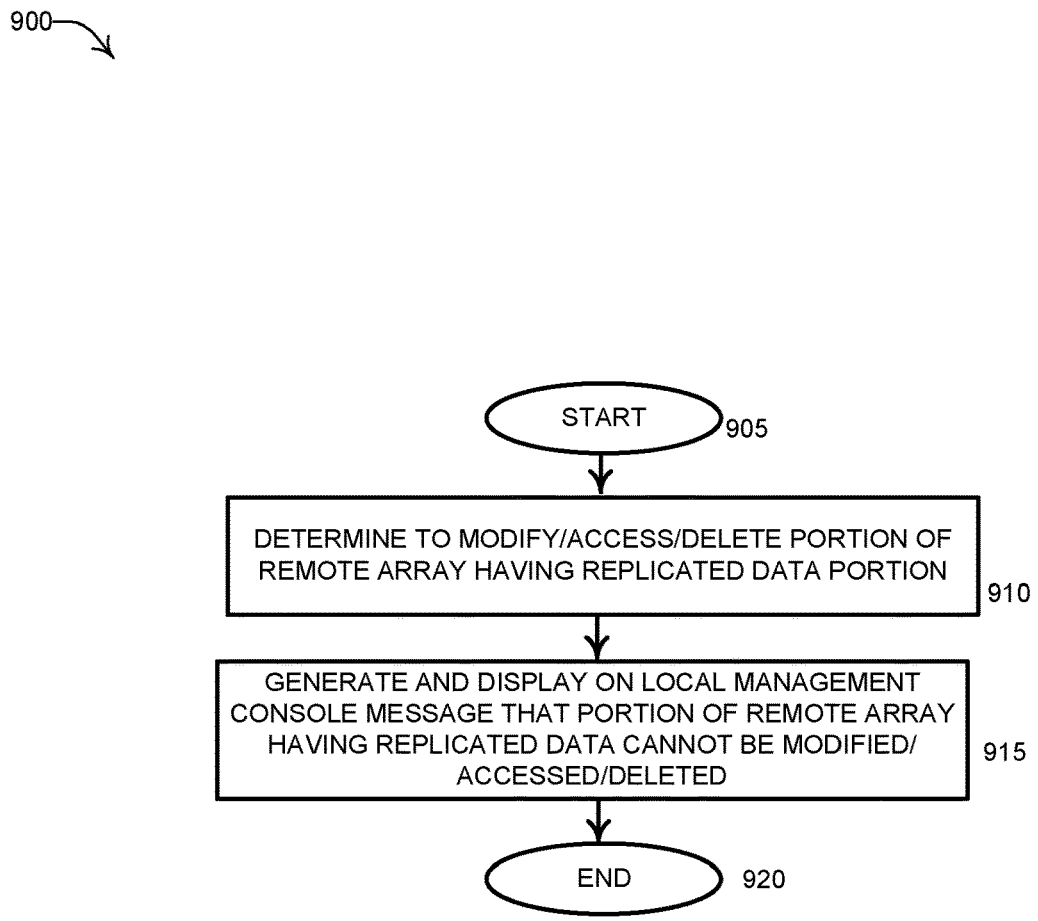
FIG. 9 illustrates a flow diagram of an example method that prevents manipulation of a data portion stored on a remote untrusted storage array.

Turning now to FIG. 9, the figure illustrates a flow diagram of an example method 900 that prevents manipulation of a data portion stored on a remote untrusted storage array. After a local private computing system receives an encrypted replicated data portion from a remote private computing system, the local private computing system may not be able to manipulate the encrypted replicated data portion. The replicated data portion may be stored as a logical volume on an array of the local private computing system, which array may be formatted or configured such that the encrypted replicated data portion from the remote private computing system cannot be modified, including being deleted from the local array, without permission from the remote private computing system (e.g., via a one-time configuration-change key).

Method 900 begins at act 905. At act 910, a local computing system may determine to modify, or manipulate, a replicated data portion that may be an encrypted version of a logical volume, stored at a storage array of the remote private computing system, that serves as a backup of the replicated logical volume. If an attempt is made at the local private computing system to manipulate the encrypted version of the replicated data, a management application of the local private computing system may generate a message and display the message on a console facilitated by a management application of the local private computing indicating that the encrypted logical volume may not be modified or manipulated. The management application of the local private computing system may generate the message based on not having a one-time configuration-change key corresponding to the encrypted version of the replicated data. 900 advances to act 920 and ends.

Figure 10:
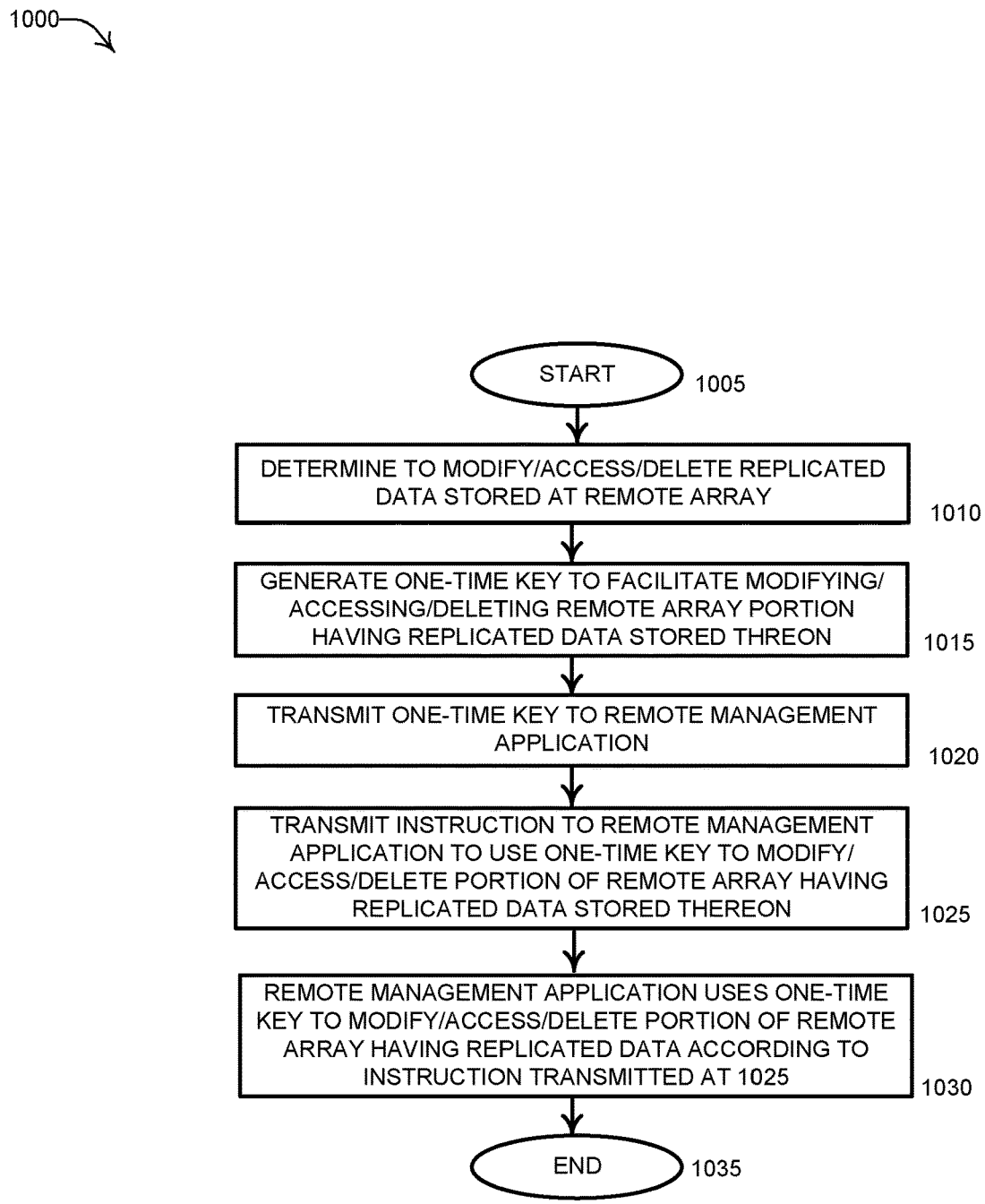
FIG. 10 illustrates a flow diagram of an example method to facilitate manipulation of a data portion stored on a remote untrusted storage array.

Turning now to FIG. 10, the figure illustrates a flow diagram of an example method 1000 to facilitate manipulation of a data portion stored on a remote storage array of a remote private computing system. Method 1000 begins at act 1005. At act 1010, a determination may be made at a local private computing system to modify or otherwise manipulate a file of original data at a local array of the local private computing system that is stored at the remote private computing system as an encrypted version of the original data, which may be referred to as replication data. If the replicated data stored at the remote computing system is a backup of the original data, the local private computing system may be configured to facilitate updating of the replication data to mirror the updated original data.

At act 1015, a local management server of the local private computing system may generate a one-time configuration-change key to be used to facilitate modifying or manipulating the array that stores the data portion at the remote private computing system. Such a one-time configuration-change key may be generated by the local management server to facilitate updating the array that stores the replication data according to changes to the original data, of which the replication data may be a backup, that a user of the local private computing system may make to the original data stored in an array of the local private computing system. A one-time use configuration-change key may comprise a public key that is complementary to a private key that was used to encrypt the original data to result in the replicated data. In addition to the public key, a one-time use configuration-change key may comprise a time indication, for example a time stamp, which may be encrypted, to indicate an expiration time of the one-time configuration-change key. The local private computing system, at act 1020, may transmit the one-time use configuration-change key to the remote private computing system. A management application of the local private computing system may transmit at act 1025 an instruction to a management application of the remote private computing system to use the one-time use configuration-change key transmitted act 1020 to modify or otherwise manipulate the array of the remote private computing system that has stored thereon the replicated data portion. At act 1030, the one-time use configuration-change key transmitted at act 1020 may be used at the remote computing system to modify or to perform another operation, as instructed at act 1025, relative to a configuration of the array that has stored thereon the replicated data portion before the one-time use configuration-change key expires. Method 1000 advances to act 1035 and ends.

Figure 11:
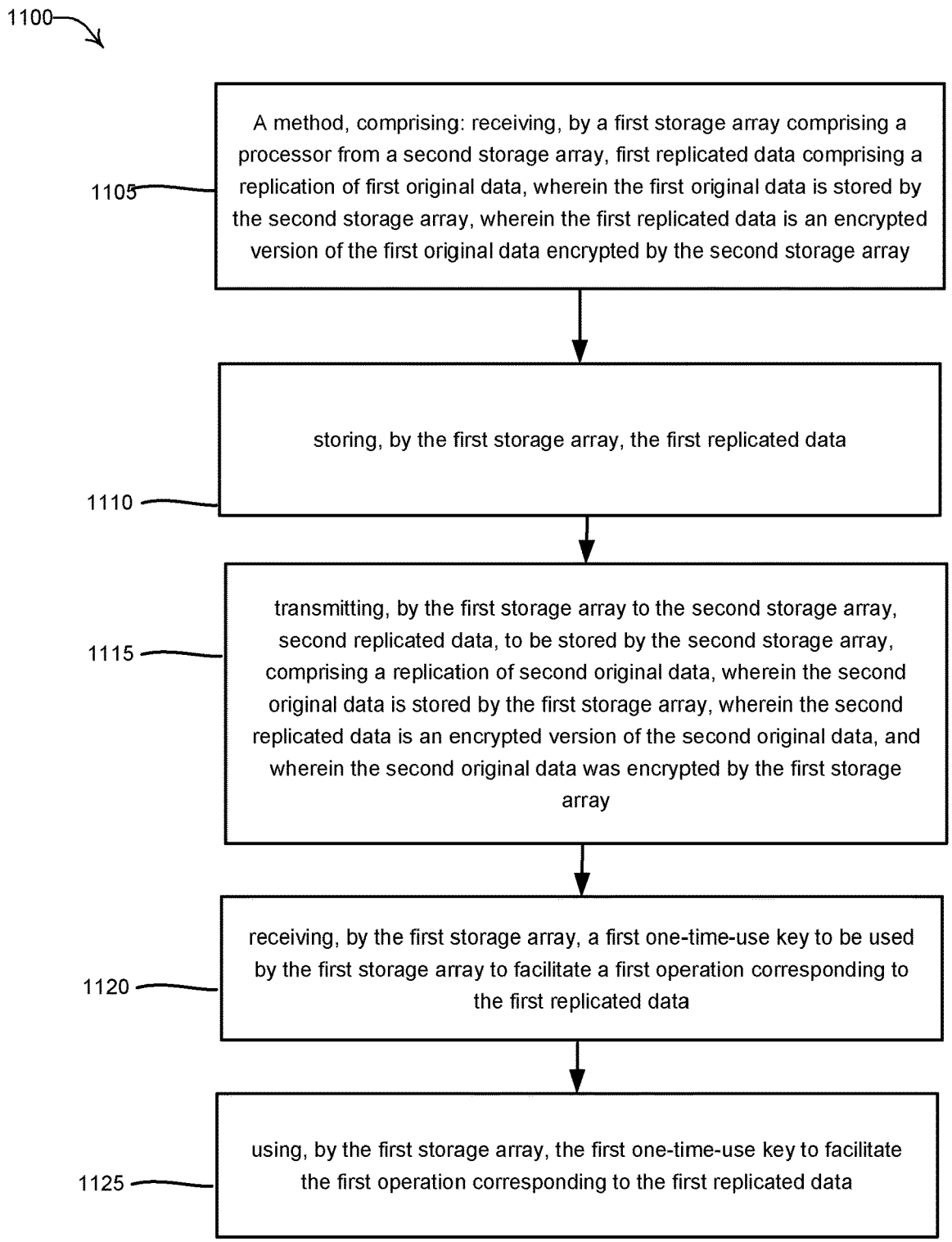
FIG. 11 illustrates an exemplary method embodiment.

Turning now to FIG. 11, the figure illustrates an example embodiment method 1100, comprising, at block 1105 receiving, by a first storage array comprising a processor from a second storage array, first replicated data comprising a replication of first original data, wherein the first original data is stored by the second storage array, wherein the first replicated data is an encrypted version of the first original data encrypted by the second storage array; at block 1110 storing, by the first storage array, the first replicated data; at block 1115 transmitting, by the first storage array to the second storage array, second replicated data, to be stored by the second storage array, comprising a replication of second original data, wherein the second original data is stored by the first storage array, wherein the second replicated data is an encrypted version of the second original data, and wherein the second original data was encrypted by the first storage array; at block 1120 receiving, by the first storage array, a first one-time-use key to be used by the first storage array to facilitate a first operation corresponding to the first replicated data; and at block 1125 using, by the first storage array, the first one-time-use key to facilitate the first operation corresponding to the first replicated data.

Figure 12:
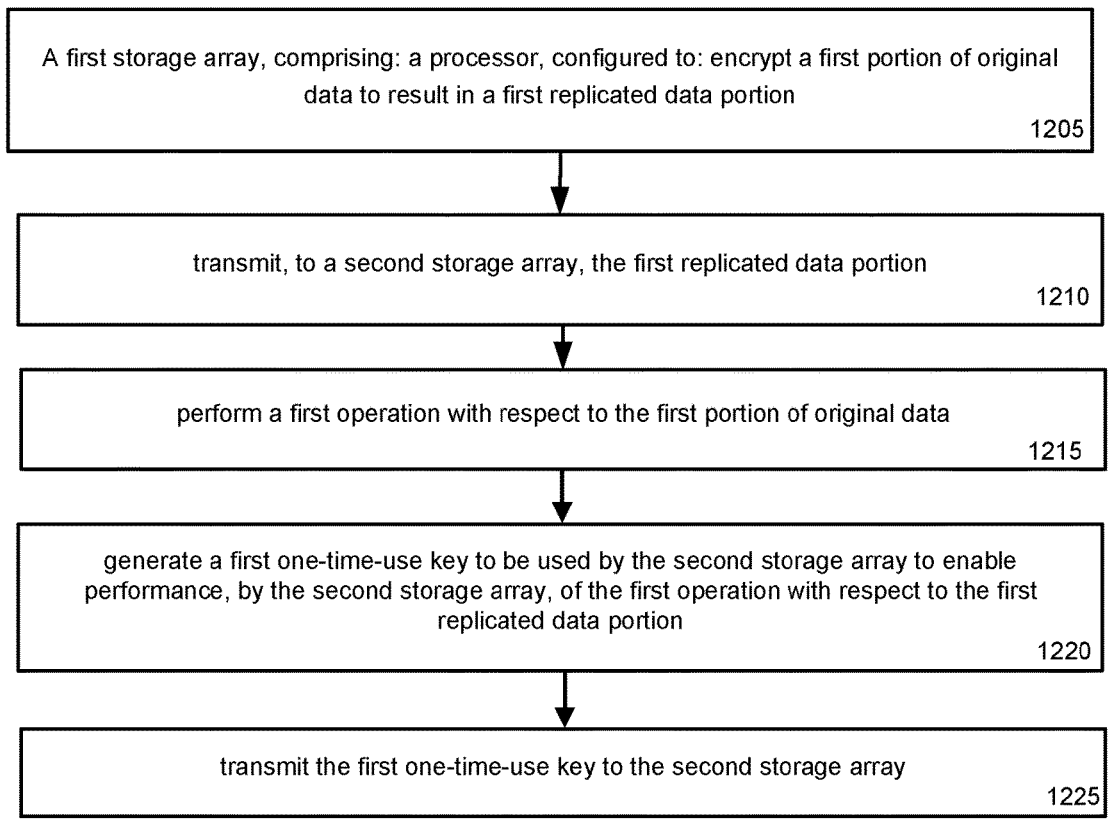
FIG. 12 illustrates an exemplary server system embodiment.

Turning now to FIG. 12, the figure illustrates an example first storage array 1200, comprising, at block 1205 a processor, configured to: encrypt a first portion of original data to result in a first replicated data portion; at block 1210 transmit, to a second storage array, the first replicated data portion; at block 1215 perform a first operation with respect to the first portion of original data; at block 1220 generate a first one-time-use key to be used by the second storage array to enable performance, by the second storage array, of the first operation with respect to the first replicated data portion; and at block 1225 transmit the first one-time-use key to the second storage array.

Figure 13:
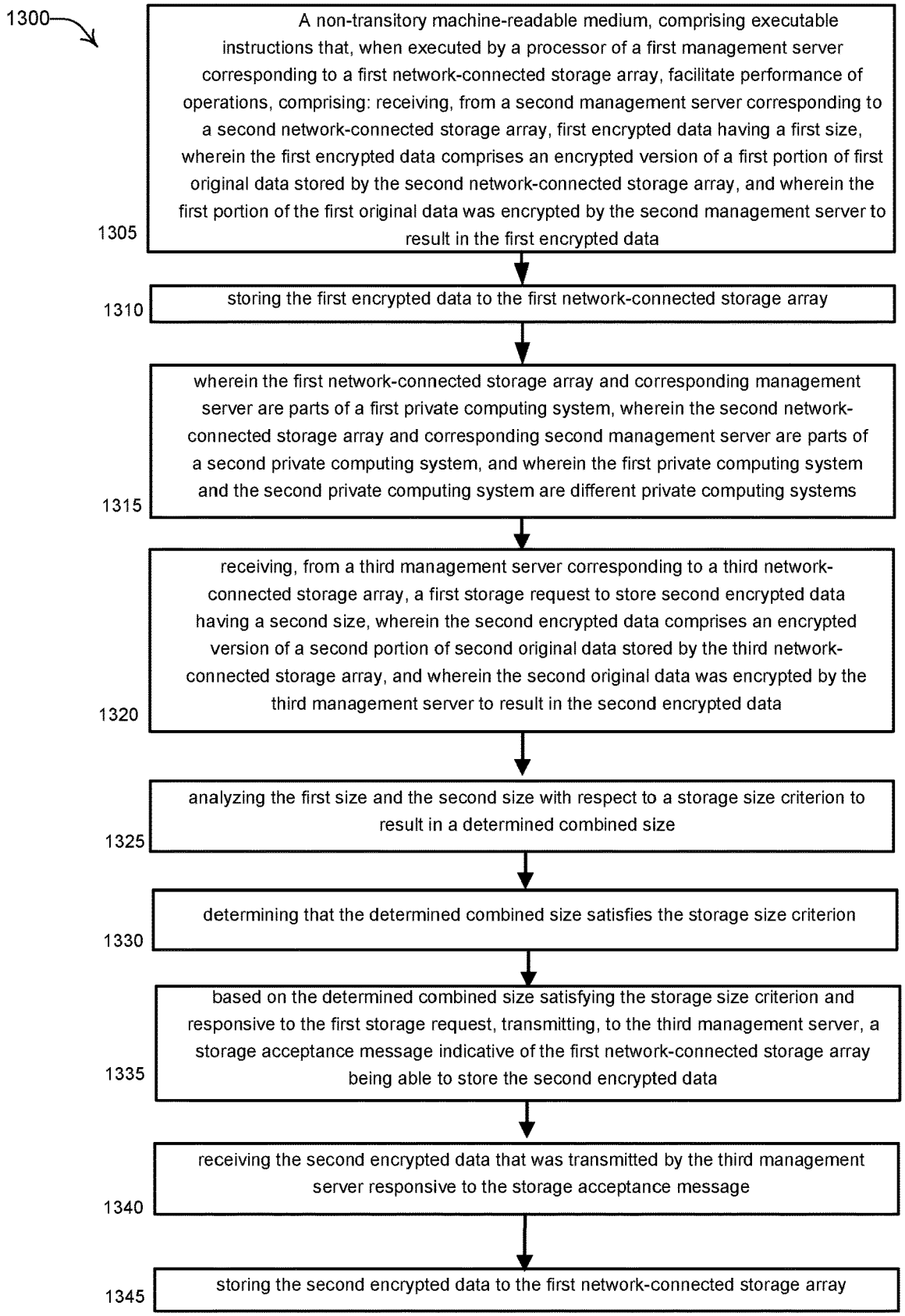
FIG. 13 illustrates an exemplary non-transitory machine-readable medium embodiment.

Turning now to FIG. 13 the figure illustrates an example non-transitory machine-readable medium 1300, comprising executable instructions that, when executed by a processor of a first management server corresponding to a first network-connected storage array, facilitate performance of operations, comprising at block 1305 receiving, from a second management server corresponding to a second network-connected storage array, first encrypted data having a first size, wherein the first encrypted data comprises an encrypted version of a first portion of first original data stored by the second network-connected storage array, and wherein the first portion of the first original data was encrypted by the second management server to result in the first encrypted data; at block 1310 storing the first encrypted data to the first network-connected storage array; at block 1315 wherein the first network-connected storage array and corresponding management server are parts of a first private computing system, wherein the second network-connected storage array and corresponding second management server are parts of a second private computing system, and wherein the first private computing system and the second private computing system are different private computing systems; at block 1320 receiving, from a third management server corresponding to a third network-connected storage array, a first storage request to store second encrypted data having a second size, wherein the second encrypted data comprises an encrypted version of a second portion of second original data stored by the third network-connected storage array, and wherein the second original data was encrypted by the third management server to result in the second encrypted data; at block analyzing the first size and the second size with respect to a storage size criterion to result in a determined combined size; at block 1325 analyzing the first size and the second size with respect to a storage size criterion to result in a determined combined size; at block 1330 determining that the determined combined size satisfies the storage size criterion; at block 1335 based on the determined combined size satisfying the storage size criterion and responsive to the first storage request, transmitting, to the third management server, a storage acceptance message indicative of the first network-connected storage array being able to store the second encrypted data; at block 1340 receiving the second encrypted data that was transmitted by the third management server responsive to the storage acceptance message; and at block 1345 storing the second encrypted data to the first network-connected storage array.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database." and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1420 (see below), non-volatile memory 1422 (see below), disk storage 1424 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 14:
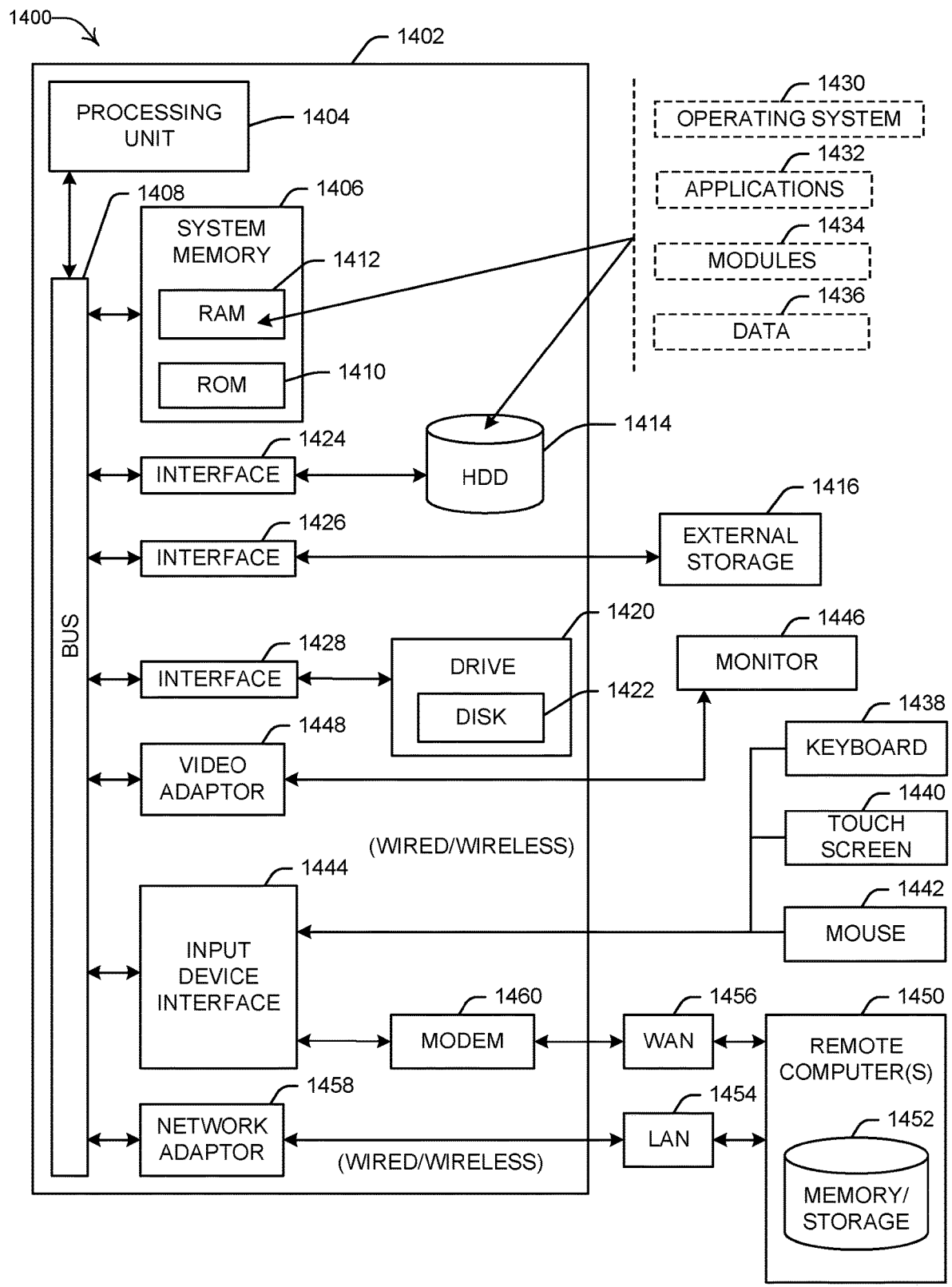
FIG. 14 illustrates an example block diagram of a computer operable to execute an embodiment of this disclosure.

Referring now to FIG. 14, in order to provide additional context for various embodiments described herein, FIG. 14 and the following discussion are intended to provide a brief, general description of a suitable computing environment 1400 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid-state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   receiving, by a first storage array comprising at least one processor from a second storage array, first replicated data comprising a replication of first original data, wherein the first original data is stored by the second storage array, and wherein the first replicated data is an encrypted version of the first original data encrypted by the second storage array;
   storing, by the first storage array, the first replicated data;
   transmitting, by the first storage array to the second storage array, second replicated data, to be stored by the second storage array, comprising a replication of second original data, wherein the second original data is stored by the first storage array, wherein the second replicated data is an encrypted version of the second original data, and wherein the second original data was encrypted by the first storage array;
   determining, by the first storage array, a size of the first replicated data to result in a determined first replicated data size;
   determining, by the first storage array, a size of the second replicated data to result in a determined second replicated data size;
   determining, by the first storage array, that the determined first replicated data size exceeds the determined second replicated data size by a disparity amount that exceeds a configured disparity amount specified by a criterion; and based on the determining that the determined first replicated data size exceeds the determined second replicated data size by the disparity amount, transmitting, by the first storage array to the second storage array, a disparity notification message comprising a disparity indication indicative of the disparity amount, wherein a first computing system comprises the first storage array, wherein a second computing system comprises the second storage array, wherein the first computing system is part of a first private computing network, and wherein the second computing system is part of a second private computing network distinct from the first private computing network.

2. The method of claim 1, wherein the disparity notification message comprises a data charge corresponding to the disparity amount.

3. The method of claim 1, further comprising:
receiving, by the first storage array, a first one-time-use key to be used by the first storage array to facilitate a first operation corresponding to the first replicated data; and
using, by the first storage array, the first one-time-use key to facilitate the first operation corresponding to the first replicated data.

4. The method of claim 1, further comprising:
receiving, by the first storage array, a first one-time-use key to be used by the first storage array to facilitate a first operation corresponding to the first replicated data;
using, by the first storage array, the first one-time-use key to facilitate the first operation corresponding to the first replicated data; and
transmitting, by the first storage array to the second storage array, a second one-time-use key to be used by the second storage array to facilitate a second operation corresponding to the second replicated data.

5. The method of claim 3, wherein the first operation corresponding to the first replicated data comprises at least one of: deleting a portion of the first replicated data, accessing the first replicated data, modifying the first replicated data, or moving the first replicated data.

6. A first storage array, comprising:
at least one processor configured to:
encrypt a first portion of original data corresponding to the first storage array to result in a first replicated data portion;
transmit, to a second storage array, the first replicated data portion;
receive, from the second storage array, encrypted data corresponding to the second storage array to result in received encrypted data;
determine a size of the first replicated data portion to result in a determined first replicated data size;
determine a size of the received encrypted data to result in a determined encrypted data size;
determine a disparity between the determined first replicated data size and the encrypted data size to result in a determined disparity size; and
based on the determined disparity size being determined to satisfy a disparity size criterion, transmit, by the first storage array to the second storage array, a disparity notification message comprising a disparity indication indicative of the determined disparity size, wherein a first computing system comprises the first storage array, wherein a second computing system comprises the second storage array, wherein the first computing system is part of a first private computing network, and wherein the second computing system is part of a second private computing network distinct from the first private computing network.

7. The first storage array of claim 6, wherein the at least one processor is further configured to:
perform a first operation with respect to the first portion of original data;
generate a first one-time-use key to be used by the second storage array to enable performance, by the second storage array, of the first operation with respect to the first replicated data portion; and
transmit the first one-time-use key to the second storage array.

8. The first storage array of claim 7, wherein the at least one processor is further configured to:
encrypt a second portion of original data to result in a second replicated data portion; and
transmit, to a third storage array, the second replicated data portion.

9. The first storage array of claim 8, wherein the at least one processor is further configured to:
perform a second operation with respect to the second portion of original data;
generate a second one-time-use key to be used by the third storage array to enable performance, by the third storage array, of the second operation with respect to the second replicated data portion; and
transmit the second one-time-use key to the third storage array.

10. The first storage array of claim 9, wherein the first operation and the second operation comprise performing a same action, by the second storage array and the third storage array, respectively, with respect to the first replicated data portion and the second replicated data portion, respectively.

11. The first storage array of claim 9, wherein the first operation and the second operation comprise modifying, by the second storage array and the third storage array, respectively, the first replicated data portion and the second replicated data portion, respectively.

12. A non-transitory machine-readable medium, comprising executable instructions that, when executed by at least one processor of a first management server corresponding to a first network-connected storage array, facilitate performance of operations, comprising:
receiving, from a second management server corresponding to a second network-connected storage array, first encrypted data having a first size, wherein the first encrypted data comprises an encrypted version of a first portion of first original data stored by the second network-connected storage array, and wherein the first portion of the first original data was encrypted by the second management server to result in the first encrypted data;
storing the first encrypted data to the first network-connected storage array;
transmitting, to the second storage array, encrypted data having an encrypted data size and corresponding to the first storage array to result in transmitted encrypted data having a transmitted encrypted data size; and
receiving, from the second storage array, a disparity notification message comprising a disparity indication indicative of a determined disparity size, wherein the determined disparity size is determined by the second network-connected storage array and corresponds to a difference between the first size and the transmitted encrypted data size, wherein the first network-connected storage array and corresponding management server are parts of a first private computing system, wherein the second network-connected storage array and corresponding second management server are parts of a second private computing system, and wherein the first private computing system and the second private computing system are different private computing systems.

13. The non-transitory machine-readable medium of claim 12, the operations further comprising:
receiving, from a third management server corresponding to a third network-connected storage array, a first storage request to store second encrypted data having a second size, wherein the second encrypted data comprises an encrypted version of a second portion of second original data stored by the third network-connected storage array, and wherein the second original data was encrypted by the third management server to result in the second encrypted data;
analyzing the first size and the second size with respect to a storage size criterion to result in a determined combined size;
determining that the determined combined size satisfies the storage size criterion;
based on the determined combined size satisfying the storage size criterion and responsive to the first storage request, transmitting, to the third management server, a storage acceptance message indicative of the first network-connected storage array being able to store the second encrypted data;
receiving the second encrypted data that was transmitted by the third management server responsive to the storage acceptance message; and
storing the second encrypted data to the first network-connected storage array.

14. The non-transitory machine-readable medium of claim 13, wherein the storage size criterion is satisfied by the determined combined size being less than a configured free storage space amount allocated on the first network-connected storage array for storage of data corresponding to one or more computing systems other than the first private computing system.

15. The non-transitory machine-readable medium of claim 13, wherein the storage size criterion is satisfied by the first size being less, by a configured amount, than the second size.

16. The non-transitory machine-readable medium of claim 12, the operations further comprising:
encrypting a second portion of second original data stored by the first network-connected storage array to result in second encrypted data having a second size;
transmitting, to the second management server, a first storage request to store the second encrypted data;
receiving, from the second management server, a first storage acceptance message indicative of the second network-connected storage array being able to store the second encrypted data; and
transmitting, to the second management server, the second encrypted data to be stored by the second network-connected storage array.

17. The non-transitory machine-readable medium of claim 16, the operations further comprising:
transmitting a second storage acceptance message indicative of the first network-connected storage array being able to store the first encrypted data,
wherein the second storage acceptance message is transmitted responsive to the first storage request.

18. The first storage array of claim 6, wherein the disparity notification message comprises a data charge corresponding to the determined disparity size.

19. The first storage array of claim 6, wherein the first private computing system is untrusted with respect to the second private computing system, and wherein the second private computing system is untrusted with respect to the first private computing system.

20. The non-transitory machine-readable medium of claim 12, wherein the disparity notification message comprises a data charge corresponding to the difference between the first size and the transmitted encrypted data size.

* * * * *